Inventor
LaMoyne Roberts
By Olson, Trexler, Wolters & Bushnell
Atty.

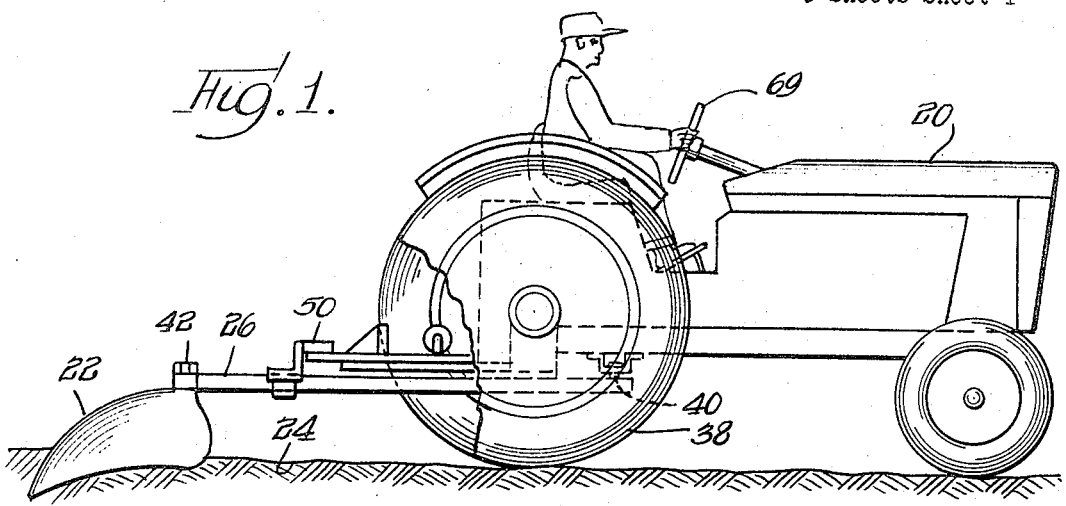
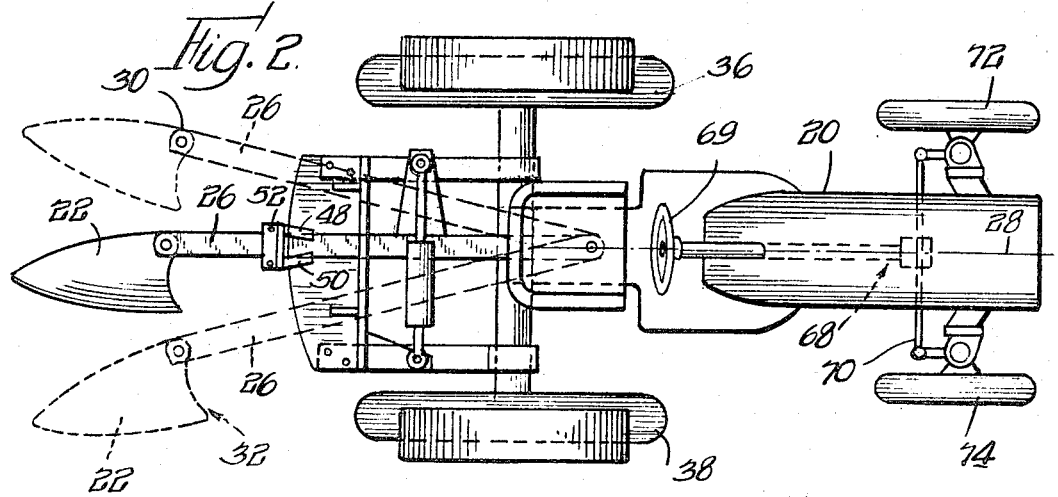
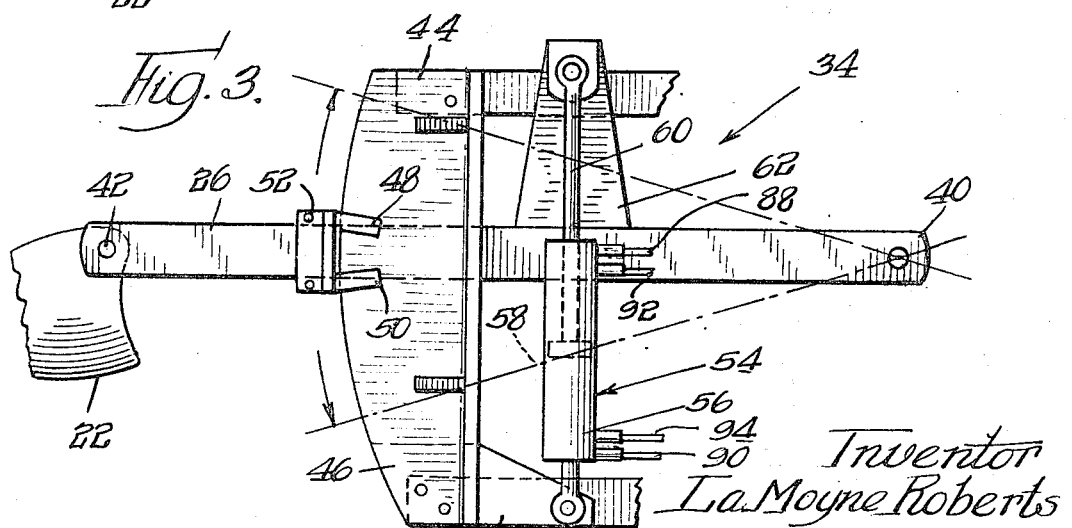

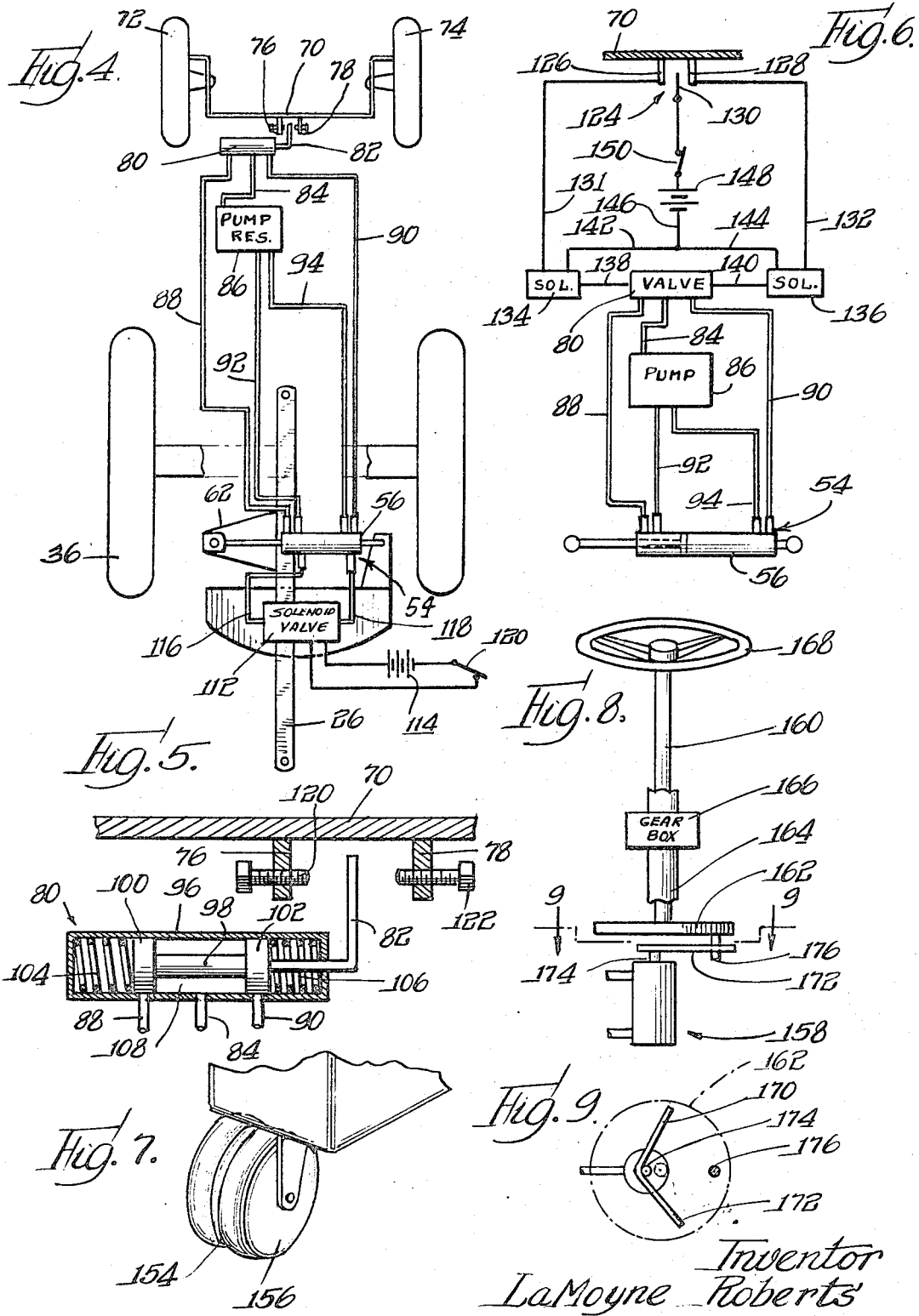

United States Patent Office 3,398,975
Patented Aug. 27, 1968

3,398,975
ADJUSTABLE HITCH FOR TRACTORS
La Moyne Roberts, Tremonton, Utah, assignor of forty-five percent to Charles R. Taylor, Tremonton, Utah
Filed May 5, 1966, Ser. No. 554,621
5 Claims. (Cl. 280—468)

ABSTRACT OF THE DISCLOSURE

An assembly for moving an earth working implement relative to a tractor including a draw bar pivotally connected to the rear of the tractor to which the earth working implement is attached, an hydraulic drive cylinder connected to the draw bar, and a control mechanism connected to the tractor in the vicinity of the front wheels thereof comprising an hydraulic cylinder arrangement which is either electrically or mechanically actuated by the turning of the steering mechanism of the tractor to in turn move the draw bar and hence the earth working implement in a corresponding direction. The hydraulic drive cylinder, when disconnected from the control mechanism, serves to dampen the movement of the draw bar.

This invention relates generally to an attachment means for adjustably connecting an earth working device to a vehicle, and more particularly to a movable hitch for altering the position of a plow relative to a tractor.

The cultivating of hilly or sloping land is commonly done by contour plowing, to retard the erosion of top soil from the sloping surface of the land. The contour plowing of hilly land is accomplished by forming furrows having a constant elevation on the side of the hill. To maintain a constant furrow elevation, a tractor must pull a plow transversely along the side of the hill. When a tractor is driven transversely along the side of a hill, gravity tends to make the tractor slide down the hill. To counteract this downward sliding tendency, it is common practice among farmers either to crimp the front wheels slightly uphill or to attach the plow off-center of the tractor.

The crimping of the front wheels of a tractor, in order to maintain a given furrow elevation on a hillside wastes power. This waste of power results from the angled front wheels which tend to push the soil aside as the tractor travels forwardly. To compensate for the wasted power, the tractor is usually driven in a relatively low gear to supply the required power for both pulling the plow and pushing aside the soil. When driven in a relatively low gear, the speed and efficiency of the tractor, and the plowing operation, is greatly reduced.

To overcome the above-mentioned deficiencies inherent in crimping the front wheels of a tractor, it is a common prior art practice to offset the connection point of the plow relative to the center line of the tractor. The plow will then exert a torque or a turning force on the tractor. When the plow is offset of the uphill side of the tractor, the torque force will tend to turn the tractor uphill. This uphill torque force will offset the tendency of the tractor to slide downhill.

The greater the slope of the land the greater must be the torque applied to the tractor to overcome its tendency to slide downwardly. The amount of uphill torque can be varied by altering the distance which the plow is offset from the center line of the tractor. The larger the distance by which the plow is offset, the larger is the uphill torque. Thus, the plow is offset a greater distance when plowing on a steep slope than on a gentle slope. The slope of the land, at a given elevation, will vary greatly in the length of a field. Thus, when contour plowing a furrow on a hill, it is usually necessary to alter the distance by which the plow is offset relative to the center line of the tractor. Efficient contour plowing requires that the plow offset be varied quickly and easily as the slope of a hill varies.

Therefore, one of the objects of this invention is to provide a means for efficient contour plowing of a hillside.

Another object of this invention is to provide a means for easily altering the position of a connection for a plow relative to a tractor while the tractor is being driven forward. These and other objects of the invention will become more apparent upon a reading of the following detailed description taken in connection with the accompanying drawings wherein:

FIG. 1 is an elevational view of a preferred embodiment of my invention as utilized for connecting a plow to a tractor;

FIG. 2 is a plan view of the tractor in FIG. 1 showing the relationship of the connecting mechanism to the tractor and plow;

FIG. 3 is an enlarged detailed view of a preferred embodiment of the connecting mechanism;

FIG. 4 is a schematic view of a preferred embodiment of the control assembly utilized with the connecting mechanism shown in FIG. 1–3;

FIG. 5 is an enlarged detailed view of the main control valve utilized in the control mechanism of FIG. 4;

FIG. 6 shows a second embodiment of the control mechanism wherein the control valve is electrically actuated;

FIG. 7 is a perspective view of the front or steering wheels of a tricycle type tractor;

FIG. 8 is a schematic drawing of the steering and control mechanism utilized with a tractor of the type shown in FIG. 7;

FIG. 9 is a plan view of the main control valve taken along the line 9—9 of FIG. 8;

Figure 10:
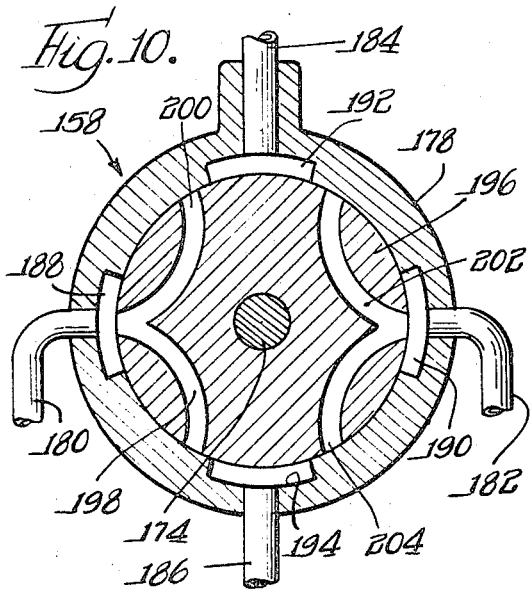
FIG. 10 is an enlarged schematic drawing of a first embodiment of the main control valve of FIG. 9 as seen in the normal position.

Referring now to the drawings in greater detail, there is shown in FIGS. 1 and 2 a tractor 20 which is pulling a plow 22 to form a furrow in the soil 24. The plow 22 is connected in alignment with the center line 28 of the tractor by a drawbar 26. Since the plow 22 and drawbar 26 are in alignment with the center of the tractor, the plow exerts a rearward force, which will have no turning moment, on the tractor as it is driven forward. As previously explained, when the side of a hill is being plowed, it is advantageous to exert an uphill turning moment of force on the tractor. If the drawbar 26 is swung to an offset position 30, indicated by dashed lines in FIG. 2, the plow exerts a torque or turning moment on the tractor 20. This turning moment is a function of the distance by which the plow 22 is offset from the center line of the tractor. When the drawbar is swung to the position 30, the turning moment causes the tractor to swing toward the driver's left as viewed in FIG. 2. If the ground slopes uphill to the left, it is apparent that the leftward turning moment counteracts the tendency of the tractor to slide downhill to the right. Similarly, if the ground slopes uphill to the right, the plow and drawbar are swung toward the right to a position 32, indicated by dashed lines in FIG. 2, and a rightward turning moment is exerted on the tractor to counteract the tendency to slide downhill to the left.

The plow 22 is fastened to the tractor by an adjustable connection or hitch assembly 34 which is located generally intermediate rear wheels 36 and 38 of the tractor 20. The hitch assembly 34 includes the drawbar 26 which is pivotably fastened to the tractor by a suitable connection means 40. At the opposite end of the drawbar 26 is a conventional connection structure 42 for attaching the plow 22 to the drawbar. The drawbar 26 is supported, for pivotable movement around the connection structure 40, by a support plate 44 which has an arcuate trailing edge 46. The support plate 44 is bolted, or connected by other suitable means, to a frame of the tractor 20. The drawbar 26 is movably supported on the plate 44 by horizontal rollers 48 and 50 which are positioned in rolling engagement with an upper surface of the support plate 44. The rollers 48 and 50 are connected to the draw bar 26 by an upstanding support bracket 52. The rollers 48 and 50 permit the drawbar 26 and plow 22 to be pivoted transversely relative to the tractor with very little frictional resistance.

The drawbar 26 is swung or pivoted relative to the tractor by means of a double acting hydraulic drive 54. The hydraulic drive 54 includes a cylinder 56 which is connected to a forwardly projecting bracket 57. The bracket 57 is formed integrally with the support plate 44. Positioned for sliding movement within the cylinder 56 is a piston 58 which has an outwardly extending push rod 60. The push rod 60 is fastened to an arm 62 which projects transversely and upwardly from the drawbar 26. The double acting drive unit 54 moves the drawbar 26 and plow, relative to the tractor 20, through the use of hydraulic fluid which moves the piston 58 and push rod 60 relative to the cylinder 56 and support plate 44. It should be noted that the hydraulic drive 54 is mounted above the heavy drawbar 26 and will be protected against damage by upwardly projecting objects over which the tractor is driven. The hydraulic drive 54 is also protected against damage by the two rear wheels 36 and 38.

Referring now to FIG. 4, a preferred embodiment of the control mechanism 66 for the hydraulic drive 54 is depicted schematically. The control mechanism 66 is actuated in response to the movements of a steering mechanism 68, shown in FIGS. 2 and 4. The steering mechanism 68 includes a steering wheel 69 which is connected in a known manner to a tie rod 70. The tie rod 70 interconnects the two front wheels 72 and 74 of the tractor. A pair of spaced apart protuberances 76 and 78 extend rearwardly from the tie rod 70. The protuberances 76 and 78 selectively actuate a main control or selector valve 80. The valve 80 is operated by a forwardly extending lever 82 which projects into the space between the protuberances 76 and 78. The lever 82 is engaged, by one of the protuberances 76 and 78, to actuate the control valve 80 when the tie rod 70 is moved a predetermined distance.

The main control valve 80 is connected, by the conduit or line 84, to a source of high pressure hydraulic fluid 86 such as a hydraulic pump which is commonly found in tractors. The main control or selector valve 80 is also connected to opposite ends of the cylinder 56 by the hydraulic lines or conduits 88 and 90. Hydraulic fluid return lines or conduits 92 and 94 connect the cylinder 56 to the pump 86. From the foregoing description, it can be seen that actuation of the hydraulic drive 54 is controlled through the steering mechanism 68 by means of the two protuberances 76 and 78 which engage the lever 82 of the main control valve 80. The turning or adjusting of the steering mechanism causes the tie bar 70 to be displaced either to the right or left, depending on the direction turned, so that one of the protuberances 76 or 78 contacts the lever 82 to actuate the control valve 80. Actuation of the control valve 80 connects the pump 86 through either the hydraulic valve 88 or 90 to the hydraulic drive 54.

The structure for the control valve mechanism 80 is shown in greater detail in FIG. 5. The control valve mechanism 80 includes an outer housing 96 in which a spool 98 is slidably mounted. The spool 98 includes two cylindrical head sections 100 and 102 to respectively seal the conduits 88 and 90 when the control valve is in the normal or neutral position shown in FIG. 5. The spool 98 is held in the neutral position by means of two springs 104 and 106 which are compressed between opposite ends of the cylinder 96 and the head sections 100 and 102 of the spool. As the tractor is turned to the left, the left protuberance or flange 76 is moved toward the right. If the steering mechanism is turned for a sufficient distance, the protuberance 76 will engage the lever 82 to move the lever and the spool 98 to the right. After the spool 98 has been moved to the right, the conduit 90 is in fluid communication with the conduit 84, through a center portion 108 of the cylinder 96, so that high pressure fluid from the pump 86 enters the conduit 90 and flows into the cylinder 56 to thereby force the piston 58 toward the left. When the piston 58 is forced to the left, the drawbar 26 and plow 22 also will be moved toward the left. Thus, the control mechanism 66 is actuated to move the plow to the left when the steering mechanism for the tractor is turned sharply toward the left.

The control mechanism is actuated to move the drawbar 26 and plow 22 to the right by turning the steering mechanism 68 hard or sharply to the right. As the steering mechanism 68 is turned hard toward the right, the protuberance 78 will engage the lever 82 to move the spool 98 to the left of the position shown in FIG. 5. After the spool 98 has been moved to the left of the position shown in FIG. 5, the conduit 88 is connected, through the center or reservoir portion of the cylinder 96, with the pump 86 through the conduit 84. When the conduit 88 is connected to the pump 86 high pressure hydraulic fluid flows through the conduit into the left end of the cylinder 56 to force the piston 58 to the right. As the piston 58 is forced to the right, the hydraulic fluid flows out of one end of the cylinder through the return line 94 to the pump while fluid enters the other end of the cylinder through the conduit 88. As the piston 58 is moved to the right the drawbar 26 and plow 22 are also moved to the right. Thus, the position of the drawbar and plow can be changed either to the right or to the left by turning the steering mechanism 68 of the tractor toward either the right or left depending on the direction in which the plow and drawbar are to be moved.

It has been found that in order to avoid an unintended displacement of the drawbar 26 and plow the lever 82 should engage the protuberances 76 and 78 only during the last ten percent of the available permissible travel or displacement of the protuberances and tie rod 70. Therefore the protuberance 76 should, when the steering mechanism is turned hard toward the left, engage the lever 82 during the last ten percent of travel. Similarly, the protuberance 78 should engage the lever 82 during the last ten percent of travel of the tie rod when the steering mechanism is turned hard toward the right. The protuberances 76 and 78 advantageously include adjusting bolts 120 and 122 which can be turned to vary the amount of travel required of the tie rod 70 before the valve 80 is actuated. Through proper positioning of the bolts 120 and 122 eighty percent of the travel of the steering mechanism 68 does not affect the positioning of the plow, since the spool 98 remains in the normal or neutral position shown in FIG. 5. It is only during the last ten percent of a turn that the spool is displaced to connect the drive mechanism 54 with the hydraulic pump 86. This permits the tractor 20 to be driven around most corners without affecting the position of the plow 22 relative to the tractor.

The control mechanism 66 also includes an auxiliary control or by-pass valve 112 which is actuated by a suitable solenoid with electrical power obtained from a battery 114. The auxiliary control valve 112 is connected by the conduits 116 and 118 to opposite ends of the cylinder 56. If the normally closed auxiliary control valve 112 is opened, by closing switch 120, the two opposite ends of the drive cylinder 56 are interconnected by the fluid conduits 116 and 118. Hydraulic fluid, from the pump 86, can then flow through the conduits 116 and 118 and the valve 112 without moving the drawbar and plow. Thus, by closing the switch 120 the drive mechanism 54 is disabled, since the high pressure hydraulic fluid will merely flow through one of the two conduits 88 and 90, the auxiliary valve 112, and into a return line 92 or 94 and back to the pump 86.

If the drawbar 26 is subjected to a sudden loading, when the auxiliary valve 112 is open, the drive mechanism 54 will act as a shock absorber or damper against the movement of the drawbar 26. This dampening effect is obtained in conjunction with the piston 58 which forces hydraulic fluid from one end of the cylinder through the lines 116 and 118 into the opposite end of the cylinder. Therefore, the drive mechanism 54, when the auxiliary valve 112 is opened, acts as a shock absorber for the drawbar 26. This shock absorbing feature of the adjustable hitch assembly permits the hitch to be utilized for many purposes other than pulling a plow. The hitch can be used to pull a wagon or any other desired object without the drive mechanism being actuated when the tractor is turned around a hard corner by merely closing the switch 120.

A second embodiment of the control mechanism is shown in FIG 6, wherein elements similar to those of the embodiment of FIG. 4 have been similarly designated. In this embodiment a suitable electrical switch 124 is actuated by the movements of the tie rod 70 in a manner similar to the actuation of the main control valve 80. The switch 124 includes two contacts 126 and 128 which protrude from the tie rod 70 in much the same manner as the two protuberances 76 and 78 extend from the tie rod in the embodiment of FIG. 4. The switch includes a centrally mounted contact lever 130 which engages the contacts 126 and 128 as the steering mechanism 68 for the tractor is turned.

The two contacts 126 and 128 are connected by the leads 131 and 132 to the solenoids 134 and 136. The two solenoids 134 and 136 are connected by shafts or rods 138 and 140 to opposite ends of the spool 98 in the main control valve 80. The solenoids 134 and 136 are also connected by leads 142, 144 and 146 to a battery 148. As the tractor is turned toward the left the contact 126 engages the switch lever 130 to complete a circuit through the solenoid 134 to pull the lever 138 to the right. Movement of the lever 138 to the left actuates the valve 80 to connect the conduit 90 with the pump 86 in the manner previously explained. Similarly, when the tractor is turned toward the right, the contacts 128 engage the switch lever 130 to complete a circuit through the solenoid 136 and battery 148. The solenoid 136 is then energized to pull the lever 140 toward the left to connect the conduit 88 with the pump 86.

In the embodiment of the invention shown in FIG. 6 a switch 150 is provided for disabling the drive mechanism 54. It will be apparent that when the switch 150 is opened the solenoids 134 and 136 cannot be energized, by the battery 148, to move the spool 98 relative to the cylinder 96. The valve 80 will then remain in its normal or closed position wherein the hydraulic drive mechanism 54 is firmly locked in place by the fluid pressure in the cylinder 56. Thus, the drawbar 26 will also be locked in position. It is contemplated that an auxiliary control or by-pass valve, similar to the valve 112, could also be utilized with the drive mechanism 54 of the embodiment shown in FIG. 6.

Many of the tractors utilized by farmers today are of a tricycle type having a pair of closely mounted front wheels 154 and 156, as shown in FIG. 7. This type of tractor does not utilize a tie bar to interconnect the front wheels. The front wheels of a tricycle type tractor are turned directly through a gear mechanism from the steering column of the tractor. In a third embodiment of the invention, shown in FIGS. 8 and 9, the main control valve 158 for the hydraulic drive 54 is mounted adjacent to a steering column 160 of the tractor. The main control valve 158 is actuated by a drive plate 162 which is rotated by a shaft 164 extending from a gear box 166. The gear box 166 is connected to the steering column 160 so that the movements of the drive plate 162 will be in a direct proportion to the rotation of the steering column 160 as the steering wheel 168 is moved to turn the tractor. The main control valve 158 includes a pair of outwardly extending arms 170 and 172 which are connected to the valve 158 by a control shaft 174. The arms 170 and 172 are pivoted by a pin 176 which extends downwardly from the drive plate 162 and is positioned between the two arms. Thus, as the tractor is turned to the left the pin 176 rotates to contact the arm 170 of the main control valve 150. Similarly, when the tractor is turned to the right, the pin 176 rotates with the plate 162 to contact the arm 172 and actuate the control valve in the opposite direction.

Referring now to FIG. 10, there is shown an enlarged schematic drawing of the control valve 158. The control valve includes an outer housing 178 to which the hydraulic lines 180 and 182 are connected. The hydraulic line 180 is connected to the drive cylinder 56 in much the same manner as the hydraulic line 88 in the embodiment shown in FIG. 4. Similarly, the hydraulic line 182 is connected to the opposite end of the drive cylinder 56 in the same manner as the hydraulic line 90 in the embodiment shown in FIG. 4. The pump 86 is connected to the rotary control valve 158 by the hydraulic line 184. A return line, to the pump 86, is connected to the control valve by the hydraulic line 186. From an inspection of FIG. 10 it will be seen that an arcuate manifold 188 is formed in the cylindrical housing 178 at the point where the hydraulic line 180 is connected to the housing. Similar manifolds 190, 192 and 194 are formed in the housing adjacent the ends of the conduits 182, 184 and 186.

A fluid distributing cylinder 196 is mounted on the control shaft 174 for rotary movement within the housing 178. The cylinder 196 includes fluid conducting channels or conduits 198, 200, 202 and 204 which are formed in the cylinder. When the cylinder is in the normal or neutral position shown in FIG. 10 the high pressure fluid, from the conduit 184, enters the manifold 192 and is not conducted to either of the hydraulic lines of conduits 180 and 182.

Figure 11:
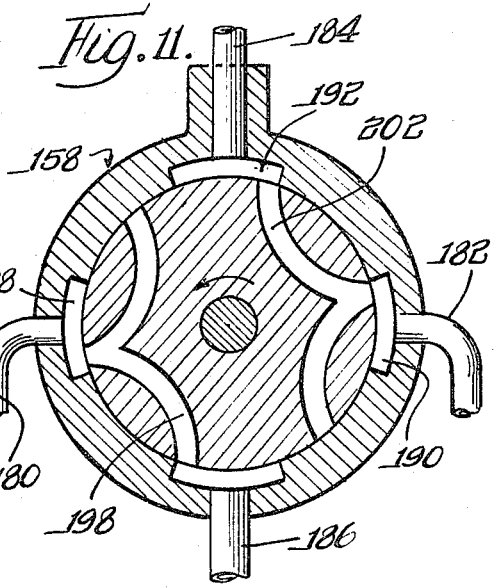
FIG. 11 is an enlarged schematic drawing of the control valve of FIG. 9 as seen when the valve has been turned to adjust the position of the connection assembly.

As shown in FIG. 11, when the cylinder 196 is rotated to the left, by turning the steering mechanism to the left, the conduit 184 and manifold 192 is connected, by the fluid channel 202, to the manifold 190 for the fluid conduit 182. After the rotary valve has been moved to this position, high pressure fluid flows from the inlet conduit 184 through the hydraulic line 182 to the drive mechanism 54. The high pressure fluid in the line 182 forces the piston 58 of the drive mechanism to move toward the left. As the piston 58 moves toward the left, the fluid trapped to the left of the piston enters the hydraulic line 180 and flows into the manifold 188 through the channel 198 to the return conduit 186 for the pump 86. Thus, by the use of a rotary control valve similar to the one shown in FIGS. 10 and 11, only a single return line 186 is required to perform the function of the two return lines 92 and 94 which are utilized in the embodiment shown in FIG. 4. It will be apparent that if the steering mechanism is turned to the right the cylinder 196 will be rotated to the right to connect the conduit 180 with the pump 86 and drive mechanism 54. The conduit 182 will be connected to the return fluid conduit 186 so that fluid can be returned to the pump in the manner previously explained.

Figure 12:
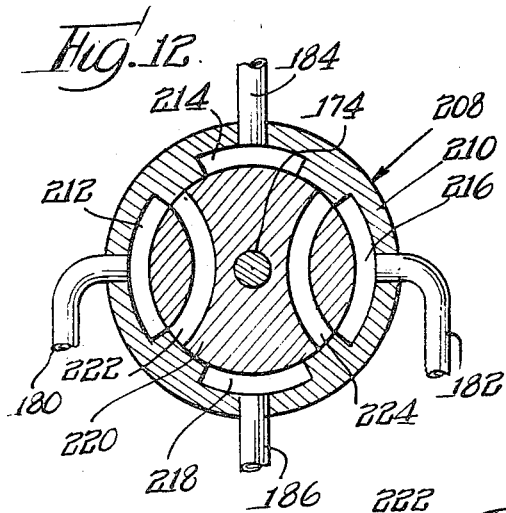
FIG. 12 is a schematic drawing of a second embodiment of the main control valve of FIG. 9 as seen in the normal position.
Figure 13:
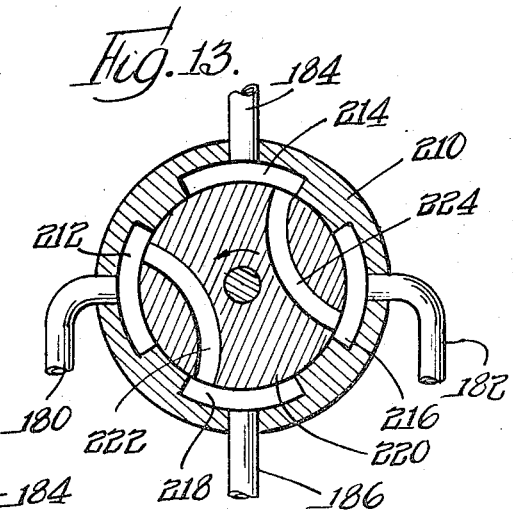
FIG. 13 is a schematic drawing of the valve of FIG. 12 rotated to move the connection assembly to the left.
Figure 14:
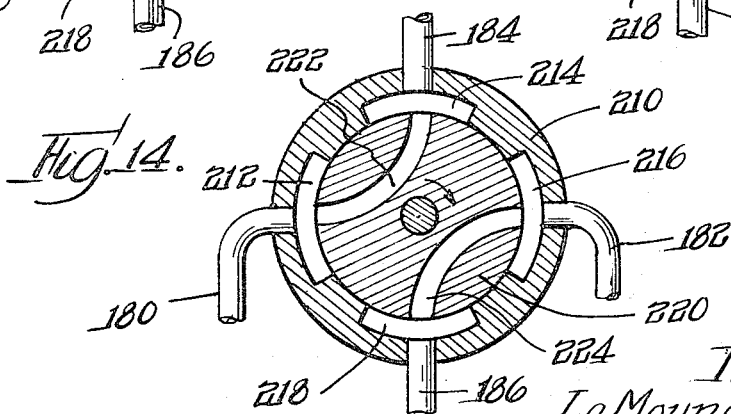
FIG. 14 is a schematic drawing of the valve of FIG. 12 when it has been rotated to move the connection assembly to the right.

A second embodiment of the rotary valve 158 is shown in FIGS. 12 to 14. In this embodiment a rotary valve 208 is utilized. The rotary valve 208 includes an outer housing 210, similar to the housing 78 of the valve 158. The conduits 180, 182, 184 and 186 are connected to the rotary valve 208 by manifolds 212, 214, 216 and 218 in much the same manner as the manifolds 188 to 194 are connected to the conduits 180 to 186 in the embodiment illustrated in FIG. 10. A distributing cylinder 220 is connected to the shaft 174. A pair of arcuate fluid channels 222 and 224 are formed in the cylinder 220. When the control valve 208 is in the normal or neutral position shown in FIG. 12, the two distributing channels 222 and 224 are sealed by the sides of the housing 210. When the cylinder is rotated, by turning the steering mechanism, as shown in FIG. 13, the fluid channel 224 interconnects the conduits 182 and 184 so that hydraulic fluid may flow from the pump through the conduits 184 and 182 into the drive cylinder 56. Similarly, return fluid flows from the conduit 180 through the channel 222 into the return conduit 186. When the drive mechanism is turned to the right, the channel 222 interconnects the high pressure inlet conduit 184 and the conduit 180 to move the piston 58 in the cylinder 56 toward the right. The return fluid will then flow through the conduit 182 and the fluid channel 224 to the return line 186.

The operation of the adjustable hitch assembly constructed as illustrated in one of the embodiments shown in FIGS. 1 to 14 will be largely apparent from the foregoing description. However, it is believed to be advantageous to provide a brief functional description of the mode in which the component parts operate. The plow 22 is connected to tractor 20 by the adjustable hitch assembly 34 so that the plow 22 can be offset from the center of the tractor. The position of the plow 20 is adjusted by moving or turning the steering mechanism 68 for the tractor. When the steering mechanism is turned, a suitable main control selector, similar to the valve 80 or switch 124, will be operated to actuate the hydraulic drive mechanism 54. Actuation of the drive mechanism 54 moves the drawbar 26 relative to the tractor 20. Since the position of the drawbar 26 can be altered by the operator of the tractor by merely turning the steering wheel 70, the plowing operation need not be interrupted to move the plow 20 relative to the tractor. After the plowing operation has been completed the drive mechanism can be disabled by actuating the auxiliary valve 112. The drive mechanism 54 will then as as a shock absorber to dampen the effect of any jerks or sudden loads which are applied to the drawbar 26.

When the plow 22 is offset from the center of the tractor, during the plowing operation, a force or torque will be exerted on the tractor tending to turn the tractor in the same direction that the plow is offset. This torque or moment is particularly advantageous when contour plowing to counteract the tendency of the tractor 20 to slide down the hill being plowed. The amount of torque exerted by the plow 20 will be directly proportional to the distance which the plow is offset from the center line of the tractor. Therefore changes in the slope of the hillside which is being plowed may be compensated for by merely moving the steering mechanism to offset the plow in a desired direction. That is, as the slope of the hillside decreases, the plow will be brought closer to the center line of the tractor.

While particular embodiments of the invention have been shown, it should be understood, of course, that the invention is not limited thereto since many modifications may be made; and it is, therefore, contemplated to cover by the appended claims any such modifications that fall within the true spirit and scope of the invention.

What is claimed is:

1. An assembly for moving an earth working implement relative to a tractor including a steering mechanism for turning the tractor, said assembly comprising; a bar member pivotally connected to the tractor, connection means adjacent an end portion of said bar member for coupling the earth working implement to said bar member, drive means fastened to said bar member for moving said bar member and earth working implement relative to said tractor, and control means mounted on said tractor and connected to said drive means, said control means including a selector means which is movable from a first neutral position wherein said drive means is disabled, to a second position wherein said drive means is activated to pivot said bar member in a first direction, said selector means also being movable from said first position to a third position wherein said drive means is activated to pivot said bar member in a second direction opposite to said first direction, and an actuator means responsive to the movements of the steering mechanism to move the selector means from said first neutral position to said second position when the steering mechanism is adjusted to turn the tractor in a first direction, and to move the selector means from said first neutral position to said third position when the steering mechanism is adjusted to turn the tractor in a second direction, said actuator means including switch means operated by the movement of said steering mechanism, solenoid means for moving said selector means between two of said three positions, and electrical circuit means interconnecting said switch means and said solenoid means whereby the moving of said steering mechanism operates said switch means to energize said solenoid means.

2. An assembly for moving an earth working implement relative to a tractor including a steering mechanism for turning the front wheels of the tractor, said assembly comprising; a bar member pivotally connected to the tractor, connection means adjacent an end portion of said bar member for coupling the earth working implement to said bar member, drive means fastened to said bar member for moving said bar member and earth working implement relative to said tractor, said drive means including a hydraulic piston and cylinder unit, and control means mounted on said tractor, said control means including a control valve means which is connected to both a source of high pressure fluid and said hydraulic piston and cylinder unit, said control valve means being selectively movable to one of at least three positions including a first position blocking fluid communication between said source of high pressure fluid and said piston and cylinder unit, a second position interconnecting said source of high pressure fluid and said piston and cylinder unit to move said piston and bar member in a first direction relative to said tractor, and a third position interconnecting said source of high pressure fluid and said piston and cylinder unit to move said piston and bar member in a second direction opposite from said first direction, and said control means further including actuator means responsive to the movement of the steering mechanism of said tractor, interconnecting said steering mechanism and said control valve means, said actuator means including first and second spaced apart protuberances and a lever means extending between said first and second spaced apart protuberances, whereby when said steering mechanism is moved to turn the tractor in a first direction, said first protuberance engages said lever means to move said control valve means from said first position to said second position and when said steering mechanism is moved to turn the tractor in a second position said second protuberance engages said lever means to move said control valve means from said first position to said third position.

3. An assembly as claimed in claim 1 wherein said steering mechanism includes a tie rod mounted between said front wheels of said tractor and wherein said first and second protuberances are connected to said tie rod and said lever means is connected to said control valve means.

4. An assembly for moving an earth working implement relative to a tractor including a steering mechanism for turning the front wheels of the tractor, said assembly comprising; a bar member pivotally connected to the tractor, connection means adjacent an end portion of said bar member for coupling the earth working implement to said bar member, drive means fastened to said bar member for moving said bar member and earth working implement relative to said tractor, said drive means including a hydraulic piston and cylinder unit, and control means mounted on said tractor, said control means including a control valve means which is connected to both a source of high pressure fluid and said hydraulic piston and cylinder unit, said control valve means being selectively movable to one of at least three positions including a first position blocking fluid communication between said source of high pressure fluid and said piston and cylinder unit, a second position interconnecting said source of high pressure fluid and said piston and cylinder unit to move said piston and bar member in a first direction relative to said tractor, and a third position interconnecting said source of high pressure fluid and said piston and cylinder unit to move said piston and bar member in a second direction opposite from said first direction, and said control means further including an actuator means responsive to movement of the steering mechanism of said tractor, said steering mechanism including a tie rod mounted intermediate first and second front wheels of said tractor, said actuator means including switch means operated by movement of said tie rod relative to said tractor, solenoid means for moving said control valve means between two of said three positions, and electrical circuit means interconnecting said switch means and said solenoid means, whereby adjusting said steering mechanism operates said switch means to engage said solenoid means.

5. An assembly for moving an earth working implement relative to a tractor including a steering mechanism for turning the front wheels of the tractor, said assembly comprising; a bar member pivotally connected to the tractor, connection means adjacent an end portion of said bar member for coupling the earth working implement to said bar member, drive means fastened to said bar member for moving said bar member and earth working implement relative to said tractor, said drive means including a hydraulic piston and cylinder unit, and control means mounted on said tractor, said control means including a control valve means which is connected to both a source of high pressure fluid and said hydraulic piston and cylinder unit, said control valve means being selectively movable to one of at least three positions including a first position blocking fluid communication between said source of high pressure fluid and said piston and cylinder unit, a second position interconnecting said source of high pressure fluid and said piston and cylinder unit to move said piston and bar member in a first direction relative to said tractor, and a third position interconnecting said source of high pressure fluid and said piston and cylinder unit to move said piston and bar member in a second direction opposite from said first direction, said control means further including a second valve means and fluid conduit means connecting said second valve means to opposite end portions of said hydraulic piston and cylinder unit, said second valve means being movable from a first position blocking the flow of fluid in said conduit means to a second position enabling fluid to flow through said conduit means from one end of said hydraulic piston and cylinder unit to an opposite end of the unit so that said drive means dampens the movement of said bar member when said second valve means is in said second position.

References Cited

UNITED STATES PATENTS

| 1,962,423 | 6/1934 | Brown | 280—468 |
| 2,130,274 | 9/1938 | Harrison et al. | 280—468 |
| 2,684,254 | 7/1954 | Goss | 280—112.1 |
| 2,686,063 | 8/1954 | Ash | 280—467 |
| 2,853,315 | 9/1958 | Hyman | 280—468 |
| 2,930,631 | 3/1960 | Voorhees | 280—445 |
| 3,212,793 | 10/1965 | Pietroroia | 280—443 |

LEO FRIAGLIA, *Primary Examiner.*